(12) United States Patent
Chamorro et al.

(10) Patent No.: US 11,870,797 B2
(45) Date of Patent: *Jan. 9, 2024

(54) ISOLATING INTERNET-OF-THINGS (IOT) DEVICES USING A SECURE OVERLAY NETWORK

(71) Applicant: CLOUDFLARE, INC., San Francisco, CA (US)

(72) Inventors: Derek Chamorro, Austin, TX (US); Molly Rose Cinnamon, Sherman Oaks, CA (US); Tom Paseka, San Francisco, CA (US); Nicholas Wondra, Savoy, IL (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,799

(22) Filed: Oct. 10, 2022

(65) Prior Publication Data

US 2023/0300158 A1    Sep. 21, 2023

Related U.S. Application Data

(63) Continuation of application No. 17/698,836, filed on Mar. 18, 2022, now Pat. No. 11,470,104.

(51) Int. Cl.
*H04L 9/40*    (2022.01)

(52) U.S. Cl.
CPC ........ *H04L 63/1425* (2013.01); *H04L 63/029* (2013.01); *H04L 63/0236* (2013.01); *H04L 63/1416* (2013.01); *H04L 63/20* (2013.01)

(58) Field of Classification Search
CPC ............ H04L 63/1425; H04L 63/0236; H04L 63/029; H04L 63/1416; H04L 63/20
See application file for complete search history.

(56) References Cited

U.S. PATENT DOCUMENTS

| 11,470,104 | B1 | 10/2022 | Chamorro et al. |
| 2017/0272940 | A1 | 9/2017 | Ghosh et al. |
| 2020/0059976 | A1* | 2/2020 | Bhatia ................... H04W 8/005 |
| 2021/0067479 | A1* | 3/2021 | Karkhanis ............. H04L 61/103 |
| 2021/0377215 | A1 | 12/2021 | Wang |

(Continued)

FOREIGN PATENT DOCUMENTS

KR    10-2019-0013964 A    2/2019

OTHER PUBLICATIONS

Notice of Allowance, U.S. Appl. No. 17/698,836, dated Aug. 30, 2022, 2 pages.

(Continued)

*Primary Examiner* — Huan V Doan
(74) *Attorney, Agent, or Firm* — NICHOLSON DE VOS WEBSTER & ELLIOTT LLP

(57) ABSTRACT

A server of a distributed cloud computing network receives, over a tunnel established between a customer-premises equipment and the compute server, traffic from an Internet-of-Things (IoT) device that is connected to the CPE. The server enforces an egress traffic policy to determine whether the traffic is permitted to be transmitted to the destination. If the traffic is not permitted to be transmitted to the destination, the server drops the traffic. If the traffic is permitted to be transmitted to the destination, the server transmits the traffic to the destination.

21 Claims, 4 Drawing Sheets

(56) References Cited

U.S. PATENT DOCUMENTS

2022/0006508 A1  1/2022  Iwahashi et al.
2022/0021707 A1  1/2022  Panchalingam et al.

OTHER PUBLICATIONS

Notice of Allowance, U.S. Appl. No. 17/698,836, dated Jun. 10, 2022, 12 pages.
International Search Report and Written Opinion, PCT App. No. PCT/US23/15545, dated Jul. 13, 2023, 9 pages.

* cited by examiner

US 11,870,797 B2

ISOLATING INTERNET-OF-THINGS (IOT) DEVICES USING A SECURE OVERLAY NETWORK

CROSS-REFERENCE TO RELATED APPLICATIONS

This application is a continuation of U.S. application Ser. No. 17/476,262, filed Sep. 15, 2021, which is hereby incorporated by reference.

FIELD

Embodiments of the invention relate to the field of computer devices and security; and more specifically, to isolating Internet of Things (IoT) using a secure overlay network.

BACKGROUND

The Internet of Things (IoT) is a network of devices that are embedded with electronics and software to enable the objects to connect and exchange data through the internet. These devices were typically not previously connected to the Internet. For example, the devices can be home appliances (e.g., ovens, fridges, dishwashers, vacuum cleaners, etc.), entertainment devices, wearable devices, health devices (e.g., scales, blood pressure monitors, etc.), baby monitors, thermostats, cameras, automobiles, etc.

IoT devices are subject to attacks like other computing devices. Many enterprises deploy their IoT devices on a separate network from production, utilizing an out-of-band network or virtual local area network (VLAN). While VLANs create isolation at Layer 2, they require access lists at their upstream routed interface to restrict Layer 3 traffic. Management of the VLANs quickly grows in complexity as each new network is another landscape to protect, patch, and detect.

SUMMARY

A server of a distributed cloud computing network receives, over a tunnel established between a customer-premises equipment and the compute server, traffic from an Internet-of-Things (IoT) device that is connected to the CPE. The server enforces an egress traffic policy to determine whether the traffic is permitted to be transmitted to the destination. If the traffic is not permitted to be transmitted to the destination, the server drops the traffic. If the traffic is permitted to be transmitted to the destination, the server transmits the traffic to the destination. The server may translate the IP address from a private IP address to a public IP address when transmitting the traffic to the destination.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Extending a secure overlay network into an on-premises environment for isolating Internet-of-Things (IoT) devices is described. The IoT device is connected to a customer premise equipment (CPE) such as a router and all network traffic to and from the IoT device passes through the CPE. A secure tunnel (e.g., a Generic Routing Encapsulation (GRE) tunnel, an IPsec tunnel) is established between the CPE and a compute server of a distributed cloud computing network such that traffic from the IoT device is transmitted over the tunnel and received at the compute server of the distributed cloud computing network.

The compute server enforces a set of one or more egress traffic policies to determine whether the traffic is permitted to be transmitted to its destination. An egress traffic policy may indicate, for example, that traffic from the IoT device is permitted only to be sent to a particular destination (e.g., a destination of the IoT service). The policy enforcement prevents lateral movement (going from one IoT device to another IoT device or another device on the same network). The destination may be at a public IP address external to the distributed cloud computing network. The egress traffic policy may be built based on historical traffic data received at compute server(s) of the distributed cloud computing network for the IoT device and/or IoT devices of a same or similar type. If the compute server determines that the traffic is permitted to be transmitted to the destination, the traffic may be transmitted to the destination. If the compute server determines that the traffic is not permitted to be transmitted to the destination, the compute server drops the traffic.

The compute server may receive traffic that is destined to the IoT device. The compute server can apply a set of one or more ingress traffic policies to determine whether to transmit the return traffic towards the IoT device. As an example, an ingress traffic policy can specify that traffic is allowed from only a certain source (e.g., an endpoint of the IoT service).

In such a way, the IoT devices are securely isolated without deploying on a separate network such as a separate VLAN. Further, the IoT devices are isolated without requiring additional hardware. In an embodiment, a network administrator can control traffic from layer 3-layer 7 with a dashboard to control the ingress and/or ingress traffic. Compared to other methods of lateral movement protection such as using a separate VLAN, embodiments described herein provide superior ease, adaptability, and security guarantees necessary to securely manage any environment with IoT devices.

Figure 1:
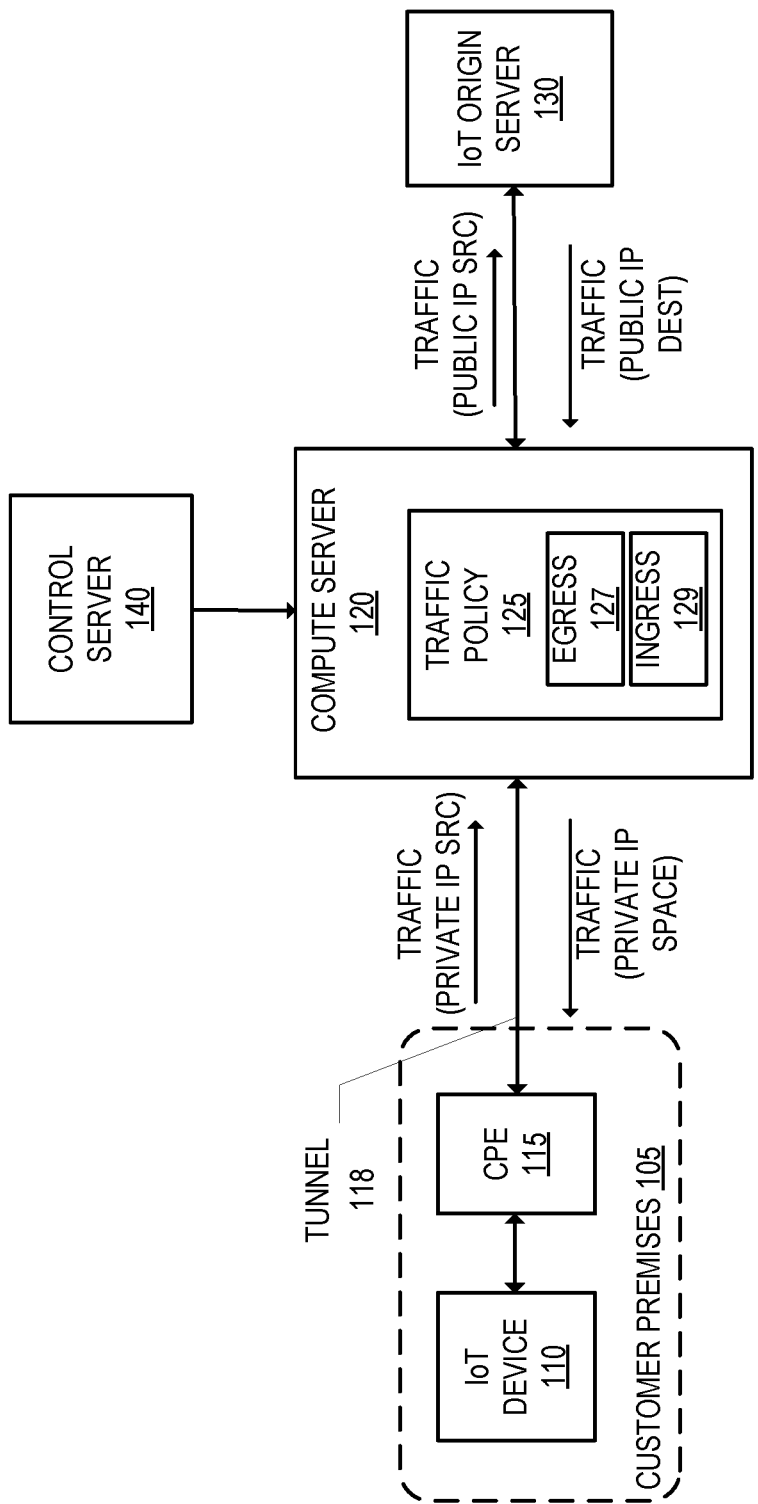
FIG. 1 shows an example system for a secure overlay network onto an on-premises environment for isolating Internet-of-Things (IoT) devices according to an embodiment.

FIG. 1 shows an example system for a secure overlay network onto an on-premise environment for isolating Internet-of-Things (IoT) devices according to an embodiment. The system shown in FIG. 1 includes the IoT device 110, the CPE 115, the compute server 120, and the IoT origin server 130.

The IoT device 110 is an IoT device that can connect to the internet. The IoT device 110 can be any type of IoT device, such as a home appliance, entertainment device, wearable device, entertainment device, wearable device, health care device, baby monitor, thermostat, camera, etc. The IoT device 110 is installed within the customer premises 105. The customer premises 105 may be a residence, business, or other premise. The IoT device 110 is connected to the CPE 115 either directly or indirectly. The CPE 115 is a device such as a router or a switch that may act as a gateway from the customer premises 105 to the public internet. The connection between the IoT device 110 and the CPE 115 may be a wired connection and/or wireless connection. As an example, the IoT device 110 may be connected via a physical cable to the CPE 115. All network traffic from and to the IoT device 110 flows through the CPE 115. The IoT device 110 may be configured to communicate over the internet via HTTP and/or HTTPs.

The compute server 120 is a server that is part of the secure overlay network of the isolation service. The compute server 120 is typically not owned or operated by the maker of the IoT device. For instance, the IoT isolation service may be a third-party service that does not require customers (e.g., IoT device manufacturers) to install hardware or software for using the service. Instead, the IoT isolation service exists at the network level. The compute server 120 may be part of a distributed cloud computing network that includes multiple compute servers that are geographically distributed. For instance, the compute server 120 may be part of a data center that includes multiple compute servers where that data center is one of multiple data centers of the distributed cloud computing network that each includes multiple compute servers. There may be hundreds to thousands of data centers, for example. Each data center can also include one or more control servers, one or more DNS servers (e.g., one or more authoritative name servers, one or more proxy DNS servers), and/or one or more other pieces of network equipment such as router(s), switch(es), and/or hubs. In an embodiment, each compute server within a data center may process IP traffic (e.g., HTTP/S, SPDY, FTP, TCP, UDP, IPSec, SIP, or other IP protocol traffic).

The IoT origin server 130 is an origin server of the central IoT service that is typically provided or maintained by the maker of the IoT device. The customer of the IoT isolation service may not own or operate the IoT origin server 130. For instance, the customer of the IoT isolation service use IoT devices from a third-party.

The control server 140 is operated by the IoT isolation service and may provide a set of tools and interfaces for the customer of the IoT isolation service to configure the IoT isolation service. For example, the control server 140, among other things, allows a customer of the IoT isolation service to register for service, configure the service such as configuring a tunnel between the CPE 115 and the compute server 120, and/or managing the service.

A secure tunnel 118 is established between the CPE 115 and the compute server 120. All network layer traffic from the IoT device 110 is transmitted to the CPE 115 and through the secure tunnel 118. As an example, the secure tunnel may be a GRE tunnel with one endpoint defined by an IP address at the CPE 115 and another endpoint defined by an IP address of the compute server 120. As another example, the secure tunnel may be an IPSec tunnel between the CPE 115 and the compute server 120. As another example, the secure tunnel may be a VPN tunnel such as a WireGuard tunnel. Traffic from other devices besides the IoT device 110 that are connected to the CPE 115 (e.g., non-IoT devices connected to the CPE 115) may also be transmitted through the GRE tunnel based on the configuration of the CPE 115.

Traffic transmitted from the CPE 115 through the secure tunnel 118 is received at the compute server 120. The compute server 120 enforces a set of one or more traffic policies 125 including a set of one or more egress traffic policies 127 to determine whether the traffic is permitted to be transmitted to the destination. The set of egress traffic policies 127 may include layer 3-layer 7 policies (e.g., layer 3 to layer 7 in the OSI model). As an example, an egress traffic policy may specify that traffic from the IoT device 110 is only allowed to go to the IoT origin server 130.

The compute server 120 evaluates the received traffic against the set of egress traffic policies 127. If the result of evaluating the received traffic against the egress traffic policy(ies) 127 is that the traffic is not permitted to be transmitted to the destination, then the compute server 120 performs the defined action for the policy such as blocking the traffic and/or alerting that the policy has been violated. If the result of evaluating the received traffic against the egress traffic policy(ies) is that the traffic is permitted to be transmitted to the destination, then the compute server 120 transmits the traffic to the destination. The traffic received over the secure tunnel 118 may use a private IP address (e.g., an RFC 1918 address). To make an outbound connection to a public IP address (e.g., the destination such as the IoT origin server 130), the compute server 120 translates the private IP to a public IP address for communicating with the destination.

In an embodiment, the compute server 120 receives traffic that is destined for the IoT device 110. For example, the compute server 120 may receive return traffic from the IoT origin server 130. The compute server 120 may enforce a set of one or more ingress traffic policies 129 to determine whether the traffic is permitted to be transmitted to the IoT device 110. The set of ingress traffic policies 129 may include layer 3-layer 7 policies (e.g., layer 3 to layer 7 in the OSI model). As an example, an ingress traffic policy may specify that traffic to the IoT device 110 is only allowed to be from the IoT origin server 130.

The compute server 120 evaluates the received traffic that is destined for the IoT device against the set of ingress traffic policies 129. If the result of evaluating the received traffic against the ingress traffic policy(ies) 129 is that the traffic is not permitted to be transmitted to the IoT device 110, then the compute server 120 performs the defined action for the policy such as blocking the traffic and/or alerting that the policy has been violated. If the result of evaluating the received traffic against the ingress traffic policy(ies) is that traffic is permitted to be transmitted to the IoT device 110, then the compute server 120 transmits the traffic to the IoT device 110 via the secure tunnel 118. Prior to transmitting the traffic to the IoT device, the compute server 120 may translate the public IP address to the private IP address associated with the IoT device 110.

The set of egress traffic policies 127 and/or the set of ingress traffic policies 129 may be configured by the customer of the IoT isolation service. For example, the customer may use the control server 140 to create and/or apply one or more traffic policies. Each traffic policy may include an action (e.g., allow, block, alert), an expression that determines the set of criteria to which the policy is applicable (e.g., destination IP, destination port, protocol, source IP, source port, server name indication (SNI) header, SNI domain, geolocation of the IP address (e.g., country code), and an operator that matches traffic to the criteria (e.g., exact match, all except exact match, in any of defined entries, not in defined entries, regex evaluates to true, all except when regex evaluates to true). A geolocation There may be a predefined policy for certain IoT devices that can be enabled by the customer. For instance, some IoT devices such as a particular camera, may be known to only communicate with a particular destination (e.g., a particular IP address), and an egress traffic policy may be predefined that allows only traffic only to that particular destination (and blocks all other traffic). In such a case, the customer may provide the product name and/or model of the IoT device and/or select the IoT device such as from a dropdown menu, and enable the predefined policy. As another example, some IoT devices may not permit any ingress traffic. In such a case, an ingress traffic policy may be configured to block all traffic to those IoT devices.

The set of traffic policies 125 may include a policy to block traffic from IoT devices destined to certain IP addresses and/or domains that are known to be malicious. The set of traffic policies 125 may include a policy to block traffic received from an IoT device and/or destined for an IoT device that has a traffic fingerprint that has been determined to match against a set of fingerprints known to be malicious traffic.

Alternatively, or additionally, the set of traffic policies 125 may include a policy that is automatically built based on historical traffic data received at the compute server 120 (and/or other compute servers of the distributed cloud computing network) sent from the IoT device 110 and/or IoT devices of a same or similar type as the IoT device 110 (e.g., from the same IoT device maker, the same IoT device product line). The compute server may determine traffic patterns of allowed and/or denied traffic for the IoT device 110 and/or IoT devices of a same or similar type.

In an embodiment, machine learning baselining may be used when creating a traffic policy. For example, based on the received historical traffic data, a baseline model of normal traffic can be built. This baseline model can then be used for alerting and/or blocking traffic that deviates from the baseline. For instance, after the compute server 120 receives traffic from the IoT device 110, the traffic may be applied to the baseline model to determine whether the traffic deviates from the baseline. If it does, then the traffic may be blocked and/or an alert may be generated. If the traffic does not deviate from the baseline, then the compute server 120 may transmit the traffic to its destination.

As previously described, the secure tunnel 118 may be a GRE tunnel with one endpoint at the CPE 115 and another endpoint defined by an IP address of the compute server 120. If the customer has multiple premises and/or multiple CPE, the customer may configure a GRE tunnel at each of these multiple premises using the same endpoint of the compute server 120. The GRE endpoint at the compute server 120 may be an anycast IP address that is shared among multiple compute servers. In such a case, each of the compute servers at use that same anycast IP address can terminate the GRE tunnel and receive traffic over the GRE tunnel from the CPE 115. Thus, a single GRE tunnel configuration on the side of the customer premises 105 effectively establishes a GRE tunnel with each of the compute servers, which eliminates the requirement to configure multiple GRE tunnels with different data centers. Thus, a single GRE tunnel is effectively shared between each of the compute servers and the CPE 115. Any of the compute servers can be removed from production or fail, and a different one of the compute servers is still able to receive the GRE traffic from the CPE 115. Also, any of the data centers can be removed from production or fail, and the next closest data center to the CPE 115 will start receiving the GRE traffic from the CPE 115. Thus, no single compute server or single data center is a single point of failure.

Establishing a GRE tunnel may include the customer accessing the control server 140 (or other interface) to provide configuration for the GRE tunnel, such as a name of the tunnel, an IP address assigned to the customer side of the GRE tunnel (e.g., an IP address of the CPE 115), the IP address assigned to the compute server 120 (which, as described elsewhere, can be an anycast IP address), an interface address (e.g., a 31-bit prefix selected from a private IP space such as 192.0.2.0/31), and a maximum transmission unit (MTU). The customer also configures the GRE tunnel on the CPE 115.

Although an embodiment has been described where GRE tunnels are configured between the compute servers and the CPE 115, in an alternative embodiment, GRE tunnels are configured between a router of each data center and the CPE 115. However, performing the GRE encapsulation/decapsulation on the compute servers instead of routers of the data centers reduces the compute overhead on the routers and may provide better scaling.

As previously described, the secure tunnel 118 may be an IPsec tunnel. In an embodiment, the IPSec tunnel is configured with an anycast IP address of the distributed cloud computing network of which the compute server is a part. For instance, a router in each of the data centers of the distributed cloud computing network may advertise the same anycast IP address and the compute servers are configured to accept traffic directed to that same anycast IP address and advertise that same anycast IP address to the router. Since the IPSec tunnel endpoints at the compute servers of the data centers use the same anycast IP address, each of the compute servers of the data centers can receive traffic directed to that IP address. As an example, the CPE 115 of the customer premises 105 opens an IPSec tunnel to an anycast IP address of the distributed cloud computing network. The CPE 115 connects to a compute server of the distributed cloud computing network that is closest to the CPE 115 via an anycast protocol implementation. In an embodiment, each compute server can perform a handshake (e.g., a key-agreement protocol such as Internet Key Exchange) with the CPE 115. For instance, key-agreement protocol configuration (e.g., customer identifier, preshared key, etc.) may be propagated to each compute server. The compute server that receives the request performs the handshake with the CPE 115 including generating security associations for encrypting and decrypting traffic. The security associations include the security parameters for the IPsec tunnel (e.g., parameters for authentication and encryption). Security associations are installed to the kernel of the compute server for intercepting packets and encrypting or decrypting as necessary. An IP packet that is destined for the CPE 115 (or received from the CPE 115) can be received at any of the compute servers of the distributed cloud computing network due to the anycast IP address. An encrypted IP packet received from the CPE 115 over the IPSec tunnel must be decrypted using the generated security association. An IP packet that is to be sent to the CPE 115 must be encrypted according to the generated security association and sent to the CPE 115 for decryption and processing.

In an embodiment, the stateful information that allows encryption and decryption of the IPsec traffic is propagated to each compute server of the distributed cloud computing network. For example, data about the IPSec tunnel (e.g., the IP address of the IPSec tunnel service that performs the handshake and the IPSec security associations) are stored in a database that is available to each compute server. This data may be pushed to each of the data centers and/or each compute server of each data center of the distributed cloud computing network (and installed to the kernels of those compute servers), or the data may be queried by a compute server that receives an IP packet that needs to be encrypted or decrypted with the security associations. Thus, a customer can establish a single IPSec tunnel to the distributed cloud computing network (which initially is terminated at a single compute server) and any of the compute servers of the data centers can receive and process the IPsec data (e.g., encrypt/decrypt). Thus, a single IPsec tunnel configuration on the side of the customer premises 105, for example, effectively establishes an IPsec tunnel with each of the compute servers of the distributed cloud computing network. Each compute server can handle these IPsec packets regardless of any one failure point. Any of the compute servers can be removed from production or fail, and a different one of the compute servers is still able to receive and process the IPsec traffic from the customer premises 105. Also, any of the data centers can be removed from production or fail, and the next closest data center to the customer premises 105 will start receiving the IPsec traffic from the customer premises 105. Thus, no single compute server or single data center is a single point of failure.

Establishing an IPsec tunnel may include the customer accessing the control server 140 (or other interface) to provide configuration for the IPsec tunnel, such as a name of the tunnel, an IP address assigned to the customer side of the IPsec tunnel (e.g., an IP address of the CPE 115), the IP address assigned to the compute server 120 (which, as described elsewhere, can be an anycast IP address), and an interface address (e.g., a 31-bit prefix selected from a private IP space such as 192.0.2.0/31). The customer also configures the IPsec tunnel on the CPE 115.

Figure 2:
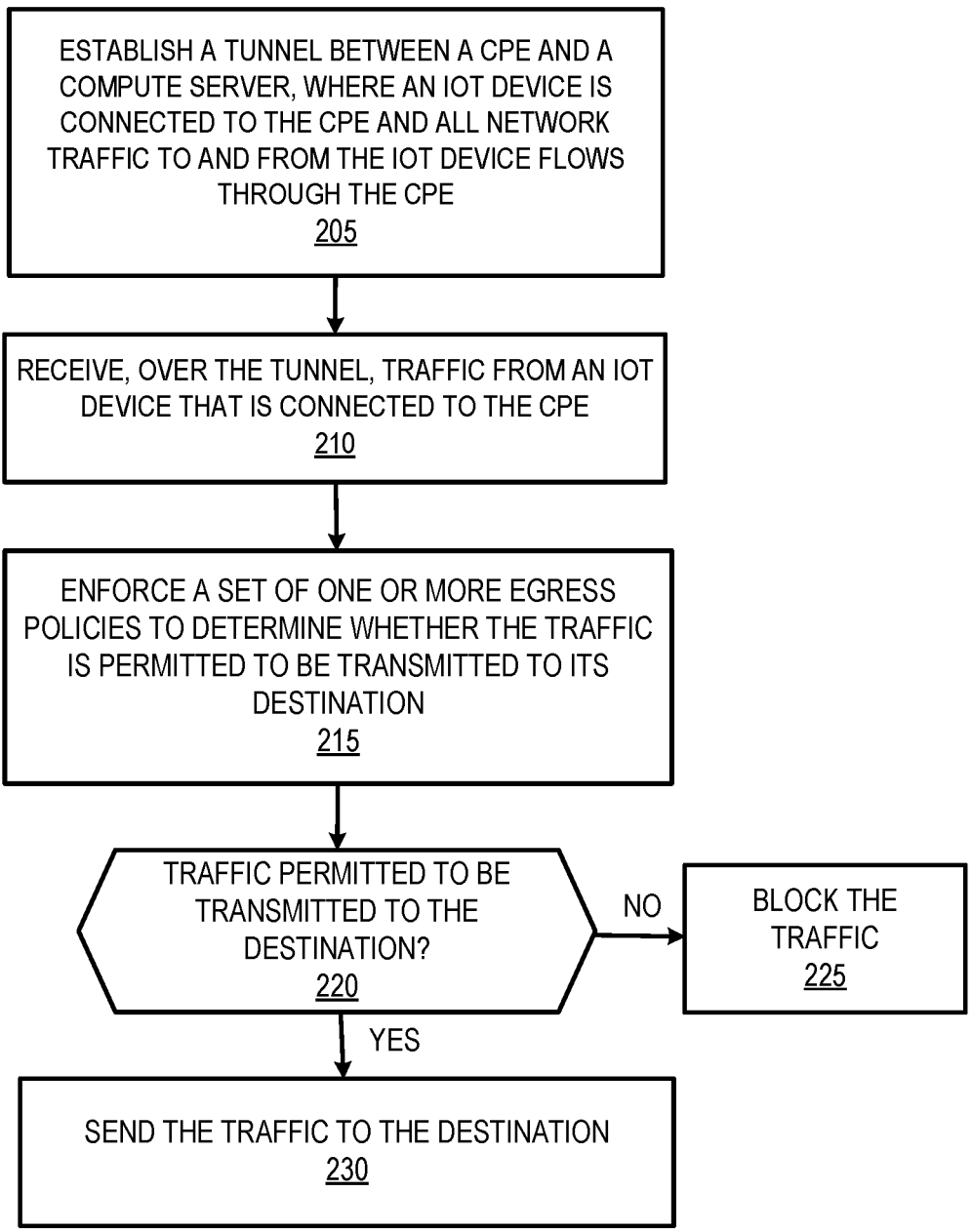
FIG. 2 is a flow diagram that illustrates exemplary operations for extending a secure overlay network into an on-premises environment for isolating Internet-of-Things (IoT) devices according to an embodiment.

FIG. 2 is a flow diagram that illustrates exemplary operations for extending a secure overlay network into an on-premises environment for isolating Internet-of-Things (IoT) devices according to an embodiment. The operations of FIG. 2 are described with respect to the exemplary embodiment of FIG. 1. However, the operations of FIG. 2 can be performed by different embodiments from those of FIG. 1, and FIG. 1 can perform operations different from those of FIG. 2.

Prior to the operations of FIG. 2, a set of one or more egress traffic policies 127 have been set to be enforced by the compute server 120 for traffic applicable from the IoT device 110. That is, the compute server 120 enforces a set of egress traffic policies 127 for traffic from the IoT device 110. An egress traffic policy may include an action (e.g., allow, block, alert), an expression that determines the set of criteria to which the policy is applicable (e.g., destination IP, destination port, protocol, source IP, source port, server name indication (SNI) header, SNI domain), and an operator that matches traffic to the criteria (e.g., exact match, all except exact match, in any of defined entries, not in defined entries, regex evaluates to true, all except when regex evaluates to true). As an example, the compute server 120 may enforce an egress traffic policy that causes all traffic received from the IoT device 110 to be dropped except for a predefined set of one or more destinations (e.g., the IoT origin server 130). The set of egress traffic policies 127 may include layer 3-layer 7 policies (e.g., layer 3 to layer 7 in the OSI model). The set of egress traffic policies 127 may be configured by a customer of the service and/or automatically built by the service. For example, an egress traffic policy may be automatically built based on historical traffic data received at the compute server 120 (and/or other compute servers of the distributed cloud computing network) sent from the IoT device 110 and/or IoT devices of a same or similar type as the IoT device 110 (e.g., from the same IoT device maker, the same IoT device product line). The compute server may determine traffic patterns of allowed and/or denied traffic for the IoT device 110 and/or IoT devices of a same or similar type.

At operation 205, a secure tunnel 118 is established between a CPE 115 and a compute server 120 of a distributed cloud computing network. The secure tunnel may be a GRE tunnel, an IPSec tunnel, a VPN tunnel, or other secure tunnel. An IoT device 110 is connected to the CPE 115 where all network traffic to and from the IoT device 110 flows through the CPE 115. The CPE 115 is configured to send network traffic from the IoT Device 110 over the secure tunnel 118.

Next, at operation 210, the compute server 120 receives, over the secure tunnel 118, traffic from the IoT device 110 that is connected to the CPE 115. The traffic may be destined to a destination that is external to the compute server 120. For example, the traffic may be destined to a destination available over the internet. The traffic may be from a private IP space (e.g., an RFC 1918 address).

At operation 215, the compute server 120 enforces a set of one or more egress traffic policies 127 to determine whether the traffic is permitted to be transmitted to the destination. The compute server 120 accesses the set of egress traffic policies 127 that are applicable for the received traffic. Next, at operation 220, the compute server 120 determines whether the traffic is permitted to be transmitted to the destination based on enforcing the set of egress traffic policies. If traffic is not permitted to be transmitted to the destination, then operation 225 is performed where the traffic is blocked. The violation of the egress traffic policy may also be logged and/or an alert may be transmitted. If traffic is permitted to be transmitted to the destination, then operation 230 is performed where the compute server 120 transmits the traffic to the destination. To make an outbound connection to a public IP address (e.g., the destination such as the IoT origin server 130), the compute server 120 translates the private IP to a public IP address for communicating with the destination.

Figure 3:
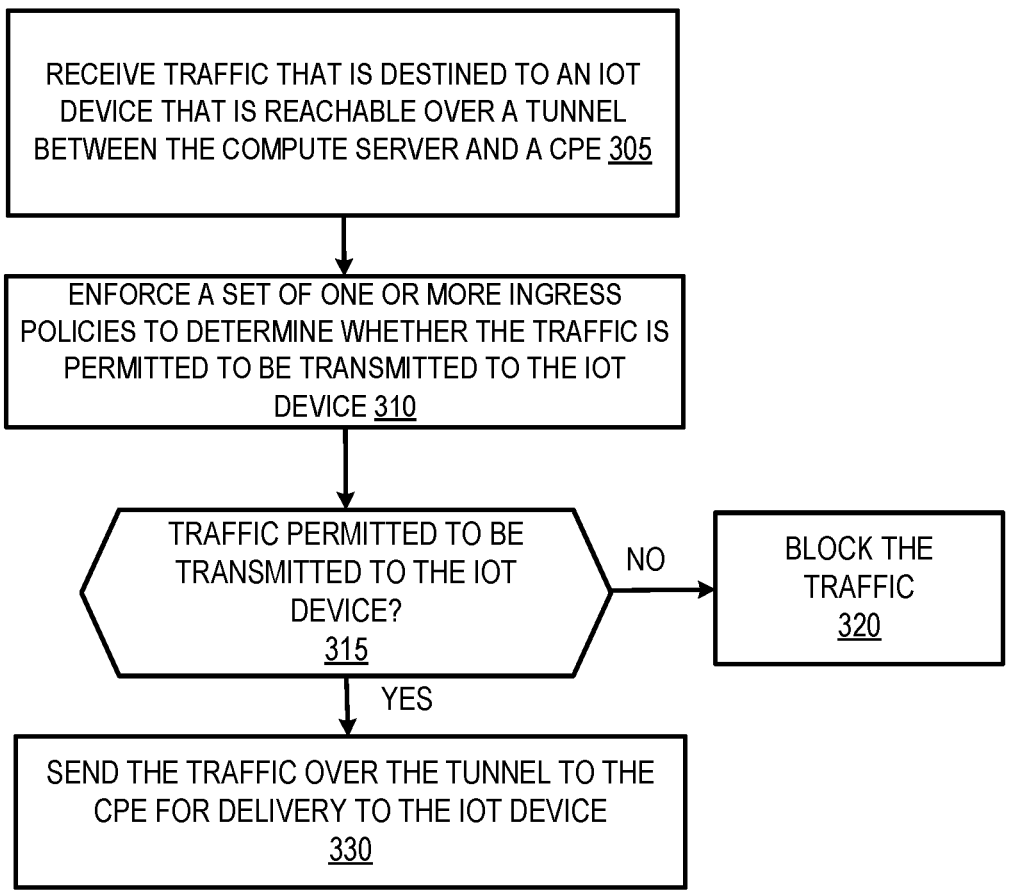
FIG. 3 is a flow diagram that illustrates exemplary operations performed by a secure overlay network extended into an on-premises environment for isolating Internet-of-Things (IoT) devices according to an embodiment.

FIG. 3 is a flow diagram that illustrates exemplary operations performed by a secure overlay network extended into an on-premise environment for isolating Internet-of-Things (IoT) devices according to an embodiment. The operations of FIG. 3 are described with respect to the exemplary embodiment of FIG. 1. However, the operations of FIG. 3 can be performed by different embodiments from those of FIG. 1, and FIG. 1 can perform operations different from those of FIG. 3.

Prior to the operations of FIG. 3, a set of one or more ingress traffic policies 129 have been set to be enforced by the compute server 120 for traffic applicable to the IoT device 110. That is, the compute server 120 enforces a set of ingress traffic policies 129 for traffic to the IoT device 110. An ingress traffic policy may include an action (e.g., allow, block, alert), an expression that determines the set of criteria to which the policy is applicable (e.g., destination IP, destination port, protocol, source IP, source port, server name indication (SNI) header, SNI domain), and an operator that matches traffic to the criteria (e.g., exact match, all except exact match, in any of defined entries, not in defined entries, regex evaluates to true, all except when regex evaluates to true). As an example, the compute server 120 may enforce an ingress traffic policy that causes all traffic destined to the IoT device 110 to be dropped except for a predefined set of one or more destinations (e.g., the IoT origin server 130). As another example, an ingress traffic policy may specify that all traffic destined for the IoT device 110 is to be dropped. The set of ingress traffic policies 129 may include layer 3-layer 7 policies (e.g., layer 3 to layer 7 in the OSI model). The set of ingress traffic policies 129 may be configured by a customer of the service and/or automatically built by the service. For example, an ingress traffic policy may be automatically built based on historical traffic data received at the compute server 120 (and/or other compute servers of the distributed cloud computing network) sent to the IoT device 110 and/or IoT devices of a same or similar type as the IoT device 110 (e.g., from the same IoT device maker, the same IoT device product line). The compute server may determine traffic patterns of allowed and/or denied traffic for the IoT device 110 and/or IoT devices of a same or similar type.

At operation 305, the compute server 120 receives traffic that is destined to an IoT device 110 that is reachable over a secure tunnel 118 between the compute server 120 and a CPE 115. The traffic may be return traffic responsive to traffic sent in operation 230 of FIG. 2. Next, at operation 310, the compute server 120 enforces a set of one or more ingress traffic policies 129 to determine whether the traffic is permitted to be transmitted to the IoT device 110. The compute server 120 accesses the set of ingress traffic policies 129 that are applicable for the received traffic. Next, at operation 215, the compute server 120 determines whether the traffic is permitted to be transmitted to the IoT device 110 based on the enforcing of the set of ingress traffic policies. If traffic is not permitted to be transmitted to the IoT device 110, then operation 320 is performed where the traffic is blocked. The violation of the ingress traffic policy may also be logged and/or an alert may be transmitted. If traffic is permitted to be transmitted to the IoT device 110, then operation 330 is performed where the compute server 120 transmits the traffic to the IoT device. Prior to transmitting the traffic to the IoT device, the compute server 120 may translate the public IP address to the private IP address associated with the IoT device 110.

An embodiment has been described where the compute server translates the private address space and public address space. In an embodiment, traffic attributed to a customer may be received at a compute server of the distributed cloud computing network in a network namespace for that customer. The network namespace is an isolated network stack specifically allocated for that customer, such as its own interfaces (with its own eBFP hooks), routing tables, netfilter configuration, etc. When a network namespace is created, a pair of virtual interfaces (e.g., virtual ethernet (veth) interfaces) are created; one in the default network namespace and one in the customer network namespace. The traffic may be received at the distributed cloud computing network in multiple ways as previously described. Although a network namespace may be used, other network isolation primitives may be used to attribute packets to specific customers.

In an embodiment, a process (e.g., in some embodiments a single process) terminates the secure tunnel in a way that allows the customer to be identified (e.g., so that customer-specific logic can be applied to the traffic) and that allows traffic to be differentiated among multiple customers that may be using the same private address space for source/destination IP addresses. This process is sometimes referred herein as the connection-terminating service (even if some of the interfaces are connectionless). Packets that are to be delivered to the connection-terminating service may be marked and encapsulated in a format that can carry identity information such as customer identity information. In an embodiment, firewall rules are used to match packets that are to be delivered to the connection-terminating service. Determining which packets to send to the connection-terminating service may be based on IP addresses, ports, direction of traffic (inbound or outbound), origination of traffic (e.g., arrived over tunnel X), or any combination of the same. The encapsulation may be a Foo-Over-UDP (FOU). The encapsulated packets include the identity information, which can be encoded in the form of a unique source IP address associated with a specific customer, through use of specific UDP ports used only for a specific customer, or through adding a header to the payload that carries identity information, for example. The marking and encapsulation may be performed in the customer network namespace.

The marked packets with identifying information may be delivered to another network namespace, referred herein as a proxy namespace. In an embodiment, there is a single proxy namespace per compute server and all traffic destined for the connection-terminating service from all customers is delivered as encapsulated packets into the single proxy namespace. Once an encapsulated packet arrives in the proxy namespace, it is decapsulated. As part of decapsulation, the packet is NATed with certain properties. For instance, a single NAT table is maintained for all traffic entering the proxy namespace, which means that all customers share the same NAT table. NAT entries include the identifier information (e.g., the customer identifier) as part of the key in the NAT table. This allows multiple customers to concurrently send connections with the same source/destination IP addresses (e.g., same private address space) and ports without creating connection conflicts in the proxy namespace. The decapsulated, NATed packets then are received at the connection-terminating process running inside the proxy namespace with an open listening socket listening for new connections on all destination IP addresses and ports that the NAT function uses. When the connection-terminating process receives traffic for a new connection, this process then looks up the NATed connection information in the NAT table of the proxy namespace. This allows the connection-terminating process to learn the original IP addresses and ports before the traffic was NATed, as well as learn the identity of the customer to which the connection belongs. This information is sent with the packets to a service of the distributed cloud computing network (e.g., a policy enforcement service). For example, this information may be sent as a preamble header with an extension to include the identity information.

To send traffic back to the customer (e.g., a SYN-ACK or other return traffic), the NATing process is reversed. The original tuple (source IP address, destination IP address, source port, destination port) is determined by accessing the single NAT table to retrieve the original packet information. Once un-NATed, the packet is encapsulated and sent to the customer namespace for the packet. The single NAT table is accessed to determine the identity information (e.g., the customer identification) using the packet header information as the key. This account identifier is translated to a destination IP address that is assigned to the encapsulation header. The encapsulated packet is sent to the customer namespace where it is decapsulated and the inner packet is routed back to the customer.

Thus, a single connection-terminating process can receive and process both public and private IP traffic from multiple customer networks while attributing ownership of each connection to the specific customer and/or network from which it originated.

Figure 4:
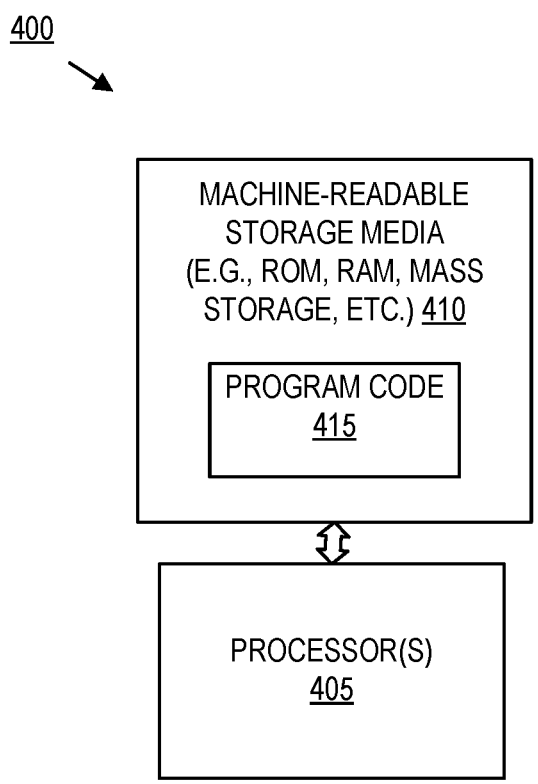
FIG. 4 illustrates an exemplary format of a data processing system that may be used according to some embodiments.

FIG. 4 shows a block diagram for an exemplary data processing system 400 that may be used in some embodiments. Data processing system 400 includes one or more processors 405 and connected system components (e.g., multiple connected chips). Alternatively, the data processing system 400 is a system on a chip or Field-Programmable gate array. One or more such data processing systems 400 may be utilized to implement the embodiments and operations described with reference to FIGS. 1-3.

The data processing system 400 is an electronic device which stores and transmits (internally and/or with other electronic devices over a network) code (which is composed of software instructions and which is sometimes referred to as computer program code or a computer program) and/or data using machine-readable media (also called computer-readable media), such as non-transitory machine-readable storage media 410 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 405. For example, the depicted non-transitory machine-readable storage media 410 may store program code 415 that, when executed by the processor(s) 405, causes the data processing system 400 to perform the IoT isolation service described herein and/or the operations of FIGS. 2-3.

The data processing system 400 may also include set or one or more physical network interface(s) to establish network connections (to transmit and/or receive code and/or data using propagating signals) with other electronic devices. It will be appreciated that one or more buses may be used to interconnect the various components shown in FIG. 4. One or more parts of an embodiment of the invention may be implemented using different combinations of software, firmware, and/or hardware.

In the preceding description, numerous specific details are set forth. However, it is understood that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases do not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
   receiving at a compute server of a distributed cloud computing network, over a tunnel established between a customer-premises equipment (CPE) and the compute server, first traffic from an Internet-of-Things (IoT) device that is connected to the CPE, wherein the first traffic is destined to a first destination;
   enforcing an egress traffic policy to determine whether the first traffic is permitted to be transmitted to the first destination, wherein the egress traffic policy specifies that traffic is only allowed to be transmitted to a destination associated with a service of the IoT device, wherein the destination associated with the service of the IoT device is external to the distributed cloud computing network;
   determining, based on the enforcing of the egress traffic policy, that the first traffic is permitted to be transmitted to the first destination because the first destination corresponds to the destination associated with the service of the IoT device, and responsive to this determination, transmitting the first traffic to the first destination;
   receiving, at the compute server, second traffic that is destined to the IoT device;
   enforcing an ingress traffic policy to determine whether the second traffic is permitted to be transmitted to the IoT device;
   determining, based on the enforcing of the ingress traffic policy, that the second traffic is not permitted to be transmitted to the IoT device, and responsive to this determination, dropping the second traffic;
   receiving at the compute server over the tunnel, third traffic from the IoT device that is connected to the CPE, wherein the third traffic is destined to a second destination;
   enforcing the egress traffic policy to determine whether the third traffic is permitted to be transmitted to the second destination; and
   determining, based on the enforcing of the egress traffic policy, that the third traffic is not permitted to be transmitted to the second destination because the second destination does not correspond to the destination associated with the service of the IoT device, and responsive to this determination, dropping the third traffic.

2. The method of claim 1, wherein the tunnel is a generic routing encapsulation (GRE) tunnel.

3. The method of claim 2, wherein a GRE endpoint at the compute server is an anycast IP address that is shared among a plurality of compute servers such that each of the plurality of compute servers can terminate the GRE tunnel.

4. The method of claim 1, wherein the tunnel is an IPSec tunnel.

5. The method of claim 4, wherein an endpoint of the IPSec tunnel at the compute server is an anycast IP address that is shared among a plurality of compute servers, wherein stateful information that allows encryption and decryption of the traffic over the IPSec tunnel is stored in a database that is available to each of the plurality of compute servers.

6. The method of claim 1, further comprising:
   wherein the first traffic has a source IP address that is a private IP address; and prior to transmitting the first traffic to the first destination, translating the private IP address to a public IP address for transmitting the first traffic to the first destination.

7. The method of claim 1, wherein the egress traffic policy specifies that the first destination is one of one or more predefined destinations to which traffic from the IoT device is allowed to be transmitted.

8. A non-transitory machine-readable storage medium that provides instructions that, if executed by a processor, will cause said processor to perform operations comprising:
receiving at a compute server of a distributed cloud computing network, over a tunnel established between a customer-premises equipment (CPE) and the compute server, first traffic from an Internet-of-Things (IoT) device that is connected to the CPE, wherein the first traffic is destined to a first destination;
enforcing an egress traffic policy to determine whether the first traffic is permitted to be transmitted to the first destination, wherein the egress traffic policy specifies that traffic is only allowed to be transmitted to a destination associated with a service of the IoT device, wherein the destination associated with the service of the IoT device is external to the distributed cloud computing network;
determining, based on the enforcing of the egress traffic policy, that the first traffic is permitted to be transmitted to the first destination because the first destination corresponds to the destination associated with the service of the IoT device, and responsive to this determination, transmitting the first traffic to the first destination;
receiving, at the compute server, second traffic that is destined to the IoT device;
enforcing an ingress traffic policy to determine whether the second traffic is permitted to be transmitted to the IoT device;
determining, based on the enforcing of the ingress traffic policy, that the second traffic is not permitted to be transmitted to the IoT device, and responsive to this determination, dropping the second traffic;
receiving at the compute server over the tunnel, third traffic from the IoT device that is connected to the CPE, wherein the third traffic is destined to a second destination;
enforcing the egress traffic policy to determine whether the third traffic is permitted to be transmitted to the second destination; and
determining, based on the enforcing of the egress traffic policy, that the third traffic is not permitted to be transmitted to the second destination because the second destination does not correspond to the destination associated with the service of the IoT device, and responsive to this determination, dropping the third traffic.

9. The non-transitory machine-readable storage medium of claim 8, wherein the tunnel is a generic routing encapsulation (GRE) tunnel.

10. The non-transitory machine-readable storage medium of claim 9, wherein a GRE endpoint at the compute server is an anycast IP address that is shared among a plurality of compute servers such that each of the plurality of compute servers can terminate the GRE tunnel.

11. The non-transitory machine-readable storage medium of claim 8, wherein the tunnel is an IPSec tunnel.

12. The non-transitory machine-readable storage medium of claim 11, wherein an endpoint of the IPSec tunnel at the compute server is an anycast IP address that is shared among a plurality of compute servers, wherein stateful information that allows encryption and decryption of traffic over the IPSec tunnel is stored in a database that is available to each of the plurality of compute servers.

13. The non-transitory machine-readable storage medium of claim 8, wherein the first traffic has a source IP address that is a private IP address, and wherein prior to transmitting the first traffic to the first destination, translating the private IP address to a public IP address for transmitting the first traffic to the first destination.

14. The non-transitory machine-readable storage medium of claim 8, wherein the egress traffic policy specifies that the first destination is one of one or more predefined destinations to which traffic from the IoT device is allowed to be transmitted.

15. A compute server, comprising:
a processor; and
a non-transitory machine-readable storage medium that provides instructions that, if executed by the processor, will cause the compute server to perform operations comprising,
receiving at the compute server of a distributed cloud computing network, over a tunnel established between a customer-premises equipment (CPE) and the compute server, first traffic from an Internet-of-Things (IoT) device that is connected to the CPE, wherein the first traffic is destined to a first destination,
enforcing an egress traffic policy to determine whether the first traffic is permitted to be transmitted to the first destination, wherein the egress traffic policy specifies that traffic is only allowed to be transmitted to a destination associated with a service of the IoT device, wherein the destination associated with the service of the IoT device is external to the distributed cloud computing network,
determining, based on the enforcing of the egress traffic policy, that the first traffic is permitted to be transmitted to the first destination because the first destination corresponds to the destination associated with the service of the IoT device, and responsive to this determination, transmitting the first traffic to the first destination,
receiving, at the compute server, second traffic that is destined to the IoT device;
enforcing an ingress traffic policy to determine whether the second traffic is permitted to be transmitted to the IoT device,
determining, based on the enforcing of the ingress traffic policy, that the second traffic is not permitted to be transmitted to the IoT device, and responsive to this determination, dropping the second traffic,
receiving at the compute server over the tunnel, third traffic from the IoT device that is connected to the CPE, wherein the third traffic is destined to a second destination,
enforcing the egress traffic policy to determine whether the third traffic is permitted to be transmitted to the second destination, and
determining, based on the enforcing of the egress traffic policy, that the third traffic is not permitted to be transmitted to the second destination because the second destination does not correspond to the destination associated with the service of the IoT device, and responsive to this determination, dropping the third traffic.

16. The compute server of claim 15, wherein the tunnel is a generic routing encapsulation (GRE) tunnel.

17. The compute server of claim 16, wherein a GRE endpoint at the compute server is an anycast IP address that is shared among a plurality of compute servers such that each of the plurality of compute servers can terminate the GRE tunnel.

18. The compute server of claim 15, wherein the tunnel is an IPSec tunnel.

19. The compute server of claim 18, wherein an endpoint of the IPSec tunnel at the compute server is an anycast IP address that is shared among a plurality of compute servers, wherein stateful information that allows encryption and decryption of the traffic over the IPSec tunnel is stored in a database that is available to each of the plurality of compute servers.

20. The compute server of claim 15, wherein the first traffic has a source IP address that is a private IP address, and wherein prior to transmitting the first traffic to the first destination, translating the private IP address to a public IP address for transmitting the first traffic to the first destination.

21. The compute server of claim 15, wherein the egress traffic policy specifies that the first destination is one of one or more predefined destinations to which traffic from the IoT device is allowed to be transmitted.

* * * * *